No. 843,287. PATENTED FEB. 5, 1907.
A. T. MacCOY.
ELECTRIC MOTOR.
APPLICATION FILED MAR. 15, 1905.
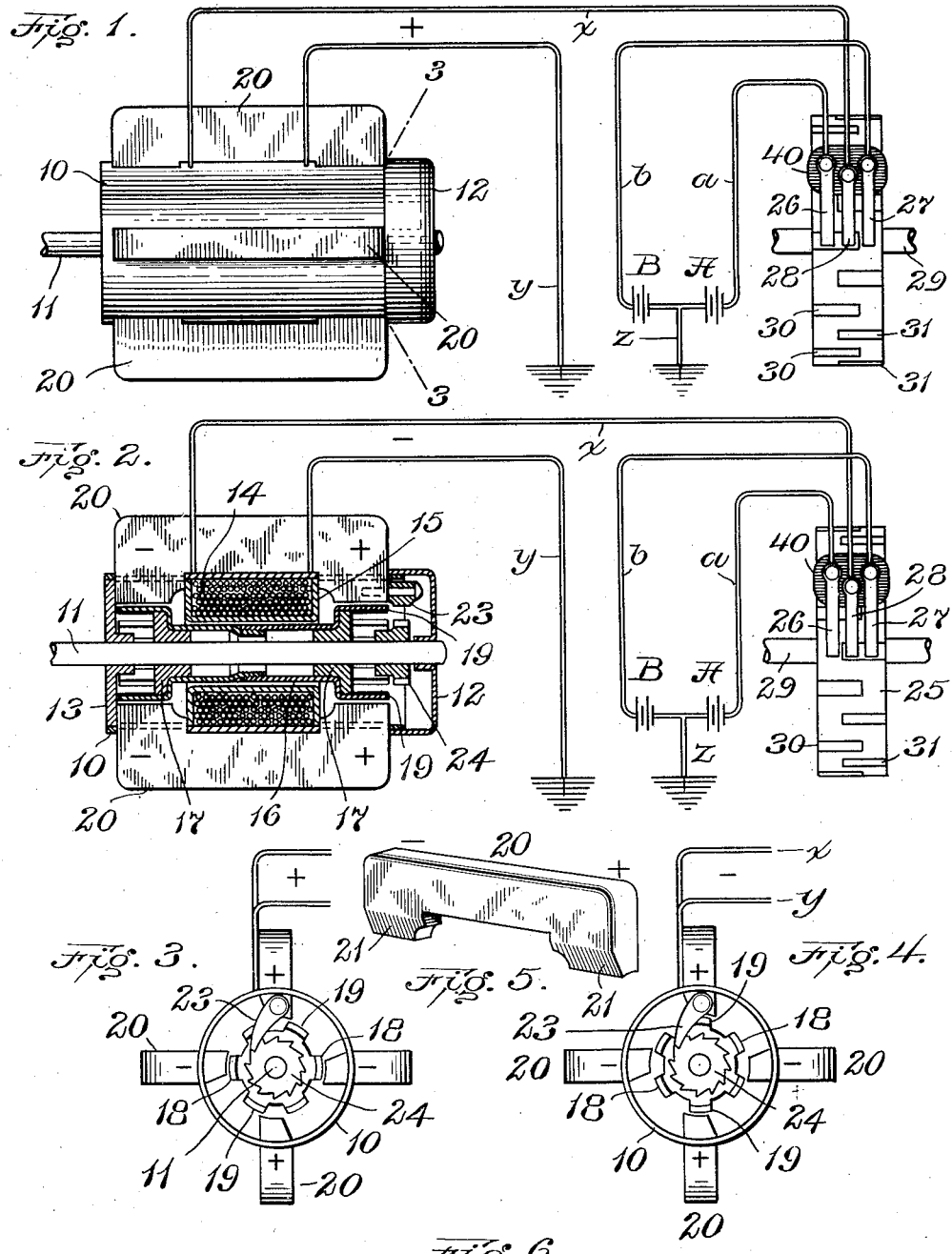
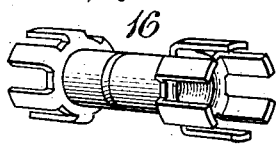
Witnesses:
Walter P. Abell
Laurence E. Kennedy
Inventor:
Andrew T. MacCoy,
by
Wright, Brown, Quimby
His Attys

UNITED STATES PATENT OFFICE.

ANDREW T. MacCOY, OF DOVER, MASSACHUSETTS.

ELECTRIC MOTOR.

No. 843,287.　　　　Specification of Letters Patent.　　　　Patented Feb. 5, 1907.

Application filed March 15, 1905. Serial No. 250,162.

*To all whom it may concern:*

Be it known that I, ANDREW T. MACCOY, of Dover, in the county of Norfolk and State of Massachusetts, have invented certain new and useful Improvements in Electric Motors, of which the following is a specification.

This invention relates to electric motors of a special type particularly adapted for instrumental purposes. This type of motor is adapted to operate at a predetermined speed which is governed by a mechanically-rotated transmitter or pole-changer which transmits thereto a "make-and-break" current of alternately-opposite polarity. The alternately positive and negative current referred to is conducted to a coil through the center of which extends a rotary bipolar armature the magnetic polarity of whose poles changes coincidently with that of the current. The rotation of the armature is caused by the initial attraction of the electromagnetized poles of the armature and the permanently-magnetized poles of permanent bar-magnets, of which there is a plurality suitably arranged.
At one end of the armature the order in which the poles of the permanent magnets are arranged about it is alternately positive and negative, while at the other end the order is alternately negative and positive.
The ends of the armature are divided into a plurality of equally-spaced segments or poles which are alternately attracted and repelled by the poles of the permanent magnets, each change of magnetic polarity occurring coincidently with each change of current.

The accompanying illustrations are full-size drawings, more or less conventional, of a motor of the herein-described type designed especially for an electric type-writer and shown in connection therewith in my copending application, Serial No. 238,987, filed December 30, 1904.

On the accompanying drawings, forming a part of this specification, Figure 1 is a side elevation of the motor and the transmitter and electrical connection of positive polarity in diagrammatic form. Fig. 2 shows the above-named elements as they appear in accordance with a change in polarity, the motor being shown in vertical section. Figs. 3 and 4 show in end elevation the relative positions of the armature under positive and negative polarity and correspond to Figs. 1 and 2, respectively. Fig. 5 is a perspective view of one of the permanent magnets. Fig. 6 is a perspective view of the armature.

The same reference characters indicate the same parts wherever they occur.

The motor is partially inclosed in a cylindrical casing or shell 10, through the center of which extends the driven member or motor-shaft 11. Said shaft is preferably of aluminium for the purpose of avoiding unnecessary weight. The bearings for said shaft are in the present case provided by caps 12 and 13, which close the two ends of the shell 10, thereby producing a dust-proof casing for the working parts.

14 is a stationary coil on a spool 15, surrounding the motor-shaft and fitting closely within the shell 10. Said coil when excited by an electric current, as hereinafter explained, is adapted to magnetize a tubular rotary armature 16, extending therethrough and rigidly mounted on the shaft 11 by means of bushings 17. The poles of the armature are so cut away as to leave a plurality of equidistant pairs of diametrically opposite fingers or subpoles, the present form having three pairs at each end, those at one end being in alinement with those at the other. The central portion or waist of the armature is somewhat smaller than the ends and fits within the spool 15 as closely as practicable without touching, so that the armature may derive full magnetic force from the coil 14 and yet be free to rotate within the spool. For construction purposes the armature is made of two pieces, which are screw-threaded together in the center. (See Figs. 2 and 6.)

The fingers or subpoles of the armature are adapted to coöperate with a plurality of permanent bar-magnets 20, arranged equidistantly about the armature and parallel thereto. The number of permanent magnets in the present case is four, and they coöperate with an armature having three pairs of fingers or subpoles on each end. The central portion of the inner edge of each magnet 20 is cut away, as shown in Fig. 5, so as to span the spool and shell and allow the ends or poles to project through the shell and lie close to the fingers. The poles of the permanent magnets are scarfed or beveled off at one side, as indicated at 21, for the purpose of obviating a dead-center, on which the armature would otherwise stop, as will be explained. The magnets are so arranged with regard to their polarity that the four radially-disposed poles at one end are in order alternately positive and negative, while at the other end the order is the reverse. (See Figs. 3 and 4.) By reason of this arrangement a positive pole is diametrically opposite a positive pole and a negative pole diametrically opposite a negative pole, and so the magnetic attraction between the permanent magnets and the electromagnetic armature is equal at both ends of the armature.

The shaft and armature are prevented from rotating backward by a lazy-pawl 23, which engages a ratchet 24, rigidly secured upon the shaft within the end cap 12.

Figs. 1 and 2 show suitable circuits connected to sources of electricity which pass through the coil 14 and a pole-changer or transmitter 25, which shifts the connections alternately from a positive to a negative circuit. The electric circuits comprise sources A and B of electricity, which may be cell-batteries. A conductor $a$ forms connection between the battery A and the brush 26, which is one of three brushes which bear upon the periphery of the transmitter 25. The conductor $b$ forms connection between the battery B and the brush 27. 28 is the third brush located between the brushes 26 and 27 and connected by a conductor $x$ to one end of the coil 14. The brushes 26, 27, and 28 are mounted upon a stationary block 40, of insulating material. The return-conductor of the coil 14 is indicated at $y$, and for the purpose of economy it is grounded, as are the batteries A and B, by a conductor $z$. The transmitter is mounted upon a shaft 29, which is adapted to be mechanically rotated by any suitable means (not shown) and at any suitable speed, depending upon the purpose for which the motor is intended. The body of the transmitter is composed of non-conducting material and is provided with a plurality of contacts 30, arranged equidistantly about its periphery and adapted to engage the brushes 26 and 28. The transmitter is also provided with a plurality of contacts 31, which are adapted to engage the brushes 27 and 28 and which are so arranged that each is between two of the contacts 30. Rotation of the transmitter, therefore, causes the brushes 26 and 27 to be alternately closed in circuit with the brush 28 by means of the contacts 30 and 31. The current of electricity by which the coil 14 is excited is thereby received alternately from the batteries A and B, with which the brushes 26 and 27 are connected.

The armature under the influence of the current of alternately-opposite polarity just explained coöperates with the permanent magnets as follows: Assuming that the transmitter is at a state of rest in the position shown in Fig. 1, the armature 16 is magnetized by a current of positive polarity and stands at the position shown by Fig. 3. The polarity of the current is indicated in Figs. 1 to 4 by plus and minus signs adjacent the conductors. Referring to Fig. 3, the two diametrically opposite fingers 18, which are nearest the permanent negative poles at the positive end of the armature, are attracted by the said poles, while at the negative end of the armature the two diametrically opposite fingers nearest the permanent positive poles are attracted thereby. By reason of the arrangement of the permanent magnets the magnetism which actuates the armature is equal at any one point to that at the corresponding diametrically opposite point, and the armature is therefore evenly balanced in that respect. Inasmuch as the other two permanent magnets are of the same polarity as the fingers to which they are adjacent, a repelling tendency exists therebetween; but this tendency has no effect upon the position of the armature, because the magnetic attraction already described prevents rotation thereof, and the position of the permanent magnets relatively to the ratchet 24 as a result of having the magnets scarfed, as at 21, causes the magnetic attraction to hold the armature so that one tooth of the ratchet presses against the pawl 23. By rotating the transmitter one step, so as to cause a contact 31 to supplant the previously-operative contact 30, the brush 26 is disconnected, the brushes 27 and 28 are connected, and the circuit is thereby shifted from the battery A to the battery B, which supplies a current of opposite polarity. (See Fig. 2.) The magnetic polarity of the armature is thereby reversed, so that the end which was formerly positive (see Fig. 3) becomes negative, (see Fig. 4,) and vice versa. The fingers 18, which were formerly attracted to the permanent negative poles, are therefore repelled thereby, and magnetic attraction is established in connection with the permanent positive poles. It is apparent that by reason of the change of polarity the fingers 18 are repelled in the direction permitted by the ratchet 24, and the fingers indicated at 19 therefore seek the permanent positive poles. The movement brought about by this change of polarity advanced the armature to the extent of one tooth of the ratchet or to the position which Fig. 4 illustrates.

By reason of the fact that there are four permanent magnets and six fingers to each pole of the armature the latter is adapted to stop at any one of twelve positions, and the ratchet 24 is therefore provided with twelve teeth, so that the armature may be correctly positioned whenever it comes to a state of rest.

So long as any one of the contacts 30 remains in engagement with the brushes 26 and 28 the relation of the armature to the permanent magnets is similar to that illustrated by Fig. 3; but when one of the contacts 31 remains in engagement with the brushes 27 and 28 the relation of the armature to the permanent magnets is similar to that in Fig. 4. A rapid succession of changes of polarity caused by continuous rotation of the transmitter produces a substantially continuous rotation of the armature, for inasmuch as a slight drag of the armature is produced by friction of the moving parts the transmitter is always slightly in advance of the theoretical corresponding position of the armature, and the result is that the armature always has a tendency to "catch up" to the transmitter.

The herein described and illustrated armature comprising a stationary externally-supporting coil or winding is manifestly light, and therefore sensitive to the magnetism to which it is subjected. The total weight of the revolving parts shown is so light that the rotation thereof may be arrested within the scope of one tooth of the ratchet by suddenly arresting the rotation of the transmitter, even though the motor be rotating at a rate as high as four hundred revolutions per minute. In case the transmitter is suddenly stopped so that one of the contacts remains in engagement with a pair of brushes a continuous current of a fixed polarity is maintained and the constant magnetism arrests the rotation of the armature. The momentum of the armature, however, carries it slightly past the point which the lines of force cause it to seek, and so the armature does not arrive at a state of rest until it describes a slight counter rotation which is arrested by the lazy-pawl 23 engaging one of the teeth of the ratchet.

Having thus explained the nature of the invention and described a way of constructing and using the same, although without attempting to set forth all of the forms in which it may be made or all of the modes of its use, I declare that what I claim is—

1. A motor comprising a series of field-magnet poles of alternate polarity, a rotatable armature having a non-rotatable coil, means rotatable independently of said armature for changing the direction of the current delivered to the coil, and positive means for preventing reverse rotation of said armature, against which means the armature is held when a constant current passes through said coil.

2. A motor comprising a series of field-magnet poles of alternate polarity, an armature rotatable in one direction step by step under the influence of said field-magnet poles and having separate subpoles, and positive means for preventing reverse rotation of said armature when the centers of said subpoles have traveled past the centers of the field-magnet poles.

3. An electric motor comprising an electromagnetic armature adapted to rotate about a fixed axis, a coil adapted to magnetize said armature, a plurality of stationary permanent magnets having poles in coöperative relation to those of said armature, and positive means for preventing reverse movement of said armature when it is at any one of a plurality of predetermined positions and when said coil is excited by a constant current, the construction and arrangement of the poles of said armature and said permanent magnets being such that said armature is caused to rotate to the next in advance of said predetermined positions each time the polarity of the operating current is reversed.

In testimony whereof I have affixed my signature in presence of two witnesses.

ANDREW T. MacCOY.

Witnesses:
C. C. STECHER,
U. B. MAY.